United States Patent
Dievendorff et al.

(10) Patent No.: US 6,425,017 B1
(45) Date of Patent: Jul. 23, 2002

(54) QUEUED METHOD INVOCATIONS ON DISTRIBUTED COMPONENT APPLICATIONS

(75) Inventors: Richard Dievendorff; Patrick J. Helland, both of Bellevue; Gagan Chopra; Mohsen Al-Ghosein, both of Redmond, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/135,378

(22) Filed: Aug. 17, 1998

(51) Int. Cl.[7] .................................................. G06F 9/54
(52) U.S. Cl. ...................................................... 709/315
(58) Field of Search ................................. 709/310–332

(56) References Cited

U.S. PATENT DOCUMENTS

| | | | |
|---|---|---|---|
| 4,635,208 A | 1/1987 | Coleby et al. | 716/11 |
| 4,677,576 A | 6/1987 | Berlin, Jr. et al. | 345/420 |
| 4,800,488 A | 1/1989 | Agrawal et al. | 709/225 |
| 4,821,220 A | 4/1989 | Duisberg | 703/2 |
| 4,953,080 A | 8/1990 | Dysart et al. | 707/103 R |
| 4,972,437 A | 11/1990 | Citron et al. | 375/259 |
| 5,093,914 A | 3/1992 | Coplien et al. | 717/129 |
| 5,119,475 A | 6/1992 | Smith et al. | 345/866 |
| 5,125,091 A | 6/1992 | Staas, Jr. et al. | 709/101 |
| 5,133,075 A | 7/1992 | Risch | 707/201 |
| 5,151,987 A | 9/1992 | Abraham et al. | 714/20 |
| 5,168,441 A | 12/1992 | Onarheim et al. | 700/17 |
| 5,210,874 A | 5/1993 | Karger | 709/328 |
| 5,212,793 A | 5/1993 | Donica et al. | |
| 5,301,280 A | 4/1994 | Schwartz et al. | 709/237 |
| 5,307,490 A | 4/1994 | Davidson et al. | 709/328 |
| 5,315,703 A | 5/1994 | Matheny et al. | 345/700 |
| 5,442,791 A | 8/1995 | Wrabetz et al. | 709/330 |
| 5,455,953 A | 10/1995 | Russell | 710/266 |
| 5,463,625 A | 10/1995 | Yasrebi | 370/401 |

(List continued on next page.)

FOREIGN PATENT DOCUMENTS

| | | | |
|---|---|---|---|
| EP | 0 414 624 A | 2/1991 | G06F/9/46 |
| EP | 0623876 A2 | 3/1994 | G06F/9/46 |
| EP | 0 674 260 A | 9/1995 | G06F/9/46 |
| EP | 0 738 966 A | 10/1996 | |
| EP | 0 777 178 A | 6/1997 | |
| WO | WO 98 02809 A | 1/1998 | |
| WO | 98 02809 | 1/1998 | G06F/9/46 |

OTHER PUBLICATIONS

Orfali et al. "Essential Client/Server Survival Guide," Van Nostrand Reinhold, 1994, pp. 124–128, 367–372.*
"Single–threaded Apartments", microsoft.com website, pp. 1–2, May 26, 1998.
"Using Secure RPC," MSDN Library CD, pp. 1–7, Apr. 1998.

(List continued on next page.)

*Primary Examiner*—St. John Courtenay, III
(74) *Attorney, Agent, or Firm*—Klarquist Sparkman, LLP

(57) ABSTRACT

An object runtime architecture allows method invocations to be made on either a synchronous, real-time basis or a queued basis using the normal call semantics of an object model. The object runtime architecture provides a proxy of an object with a method invocation recorder for receiving method calls of a client on the object, and marshaling the method calls into a message for sending to a queue associated with the object. The object runtime architecture further provides a listener for dispatching the message from the queue to a player which uses a stub to unmarshal the message in order to issue the method calls to the object. The object runtime architecture thus decouples the client and objects lifetimes and availability, without requiring explicit programming of the client and object to perform message queuing. Accordingly, with no modification of the object's interface structure or code, the same object can be used in either a real-time or queued environment. This allows the decision between real-time or queued method invocations to be made much later than at development of the object, such as at run-time creation of the object.

14 Claims, 7 Drawing Sheets

U.S. PATENT DOCUMENTS

| | | | |
|---|---|---|---|
| 5,481,715 A | 1/1996 | Hamilton et al. | 709/316 |
| 5,485,617 A | 1/1996 | Stutz et al. | 709/315 |
| 5,504,898 A | 4/1996 | Klein | 709/101 |
| 5,511,197 A | 4/1996 | Hill et al. | |
| 5,517,645 A | 5/1996 | Stutz et al. | 709/316 |
| 5,519,867 A | 5/1996 | Moeller et al. | 709/107 |
| 5,560,029 A | 9/1996 | Papadopoulos et al. | 712/25 |
| 5,574,862 A | 11/1996 | Marianetti, II | 710/100 |
| 5,574,918 A | 11/1996 | Hurley et al. | 712/220 |
| 5,577,251 A | 11/1996 | Hamilton et al. | 709/101 |
| 5,577,252 A | 11/1996 | Nelson et al. | 709/100 |
| 5,581,686 A | 12/1996 | Koppolu et al. | |
| 5,581,760 A | 12/1996 | Atkinson et al. | |
| 5,598,562 A | 1/1997 | Cutler et al. | 709/104 |
| 5,606,719 A | 2/1997 | Nichols et al. | 710/56 |
| 5,619,710 A | 4/1997 | Travis, Jr. et al. | 709/203 |
| 5,625,775 A | 4/1997 | Davis et al. | 709/227 |
| 5,652,888 A | 7/1997 | Burgess | 709/318 |
| 5,675,796 A | 10/1997 | Hodges et al. | 709/100 |
| 5,687,370 A | 11/1997 | Garst et al. | |
| 5,689,708 A | 11/1997 | Regnier et al. | 709/229 |
| 5,764,897 A | 6/1998 | Khalidi | |
| 5,787,251 A | 7/1998 | Hamilton et al. | 709/203 |
| 5,787,281 A | 7/1998 | Schreiber et al. | 709/328 |
| 5,790,789 A | 8/1998 | Suarez | 709/202 |
| 5,794,038 A | 8/1998 | Stutz et al. | |
| 5,802,291 A | 9/1998 | Balick et al. | |
| 5,822,585 A | 10/1998 | Noble et al. | 709/316 |
| 5,838,916 A | 11/1998 | Domenikos et al. | 709/219 |
| 5,857,197 A | 1/1999 | Mullins | 707/103 R |
| 5,857,201 A | 1/1999 | Wright, Jr. et al. | 707/104.1 |
| 5,864,669 A | 1/1999 | Osterman et al. | 709/203 |
| 5,884,316 A | 3/1999 | Bernstein et al. | 707/103 R |
| 5,889,942 A | 3/1999 | Orenshteyn | 713/201 |
| 5,889,957 A | 3/1999 | Ratner et al. | |
| 5,907,675 A | 5/1999 | Aahlad | 709/203 |
| 5,913,061 A * | 6/1999 | Gupta et al. | 709/310 |
| 5,933,593 A | 8/1999 | Arun et al. | |
| 5,958,004 A | 9/1999 | Helland et al. | |
| 5,958,010 A | 9/1999 | Agarwal et al. | 709/224 |
| 6,026,428 A | 2/2000 | Hutchison et al. | |
| 6,061,796 A | 5/2000 | Chen et al. | 713/201 |
| 6,094,688 A * | 7/2000 | Mellen-Garnett et al. | 709/328 |
| 6,105,147 A | 8/2000 | Molloy | |
| 6,134,594 A | 10/2000 | Helland et al. | 709/229 |

OTHER PUBLICATIONS

Brown et al., "Distributed Component Object Model Protocol—DCOM/1.0," http://globecom.net/ietf/draft/draft-brown-dcom-v1-spec-03.html, pp. 1–52, Jan. 1998.

"Java Remote Method Invocation," Sun Microsystems, Inc., chapters 1–10 (Dec. 1997).

"Microsoft® Message Queue Server Guide," *MSDN Library—Jul. 1998*, pp. 1–72 (1998).

"MSMQ Reference," *MSDN Library—Jul. 1998*, pp. 1–87 (1998).

Tripathi et al., "Design of a remote procedure call system for object-oriented distributed programming," *Software Practice & Experience*, GB, John Wiley & Sons, Ltd., Chichester, vol. 28, No. 1, pp. 23–47 (1998).

R. Limprecht, "Microsoft Transaction Server", IEEE, pp. 14–18 (Feb. 1997).

G. Eddon, "COM+: The Evolution of Component Services", IEEE on Computer, pp. 104–106 (Jul. 1999).

Object Transaction Services, OMG document Jun. 1, 1994.

(No author given) "Transaction Context Objects in Microsoft TRansaction Server", MSDN, pp (2) (Jun. 1997).

D. Chappell, "The Microsoft Transaction Server (MTS)—Transactions Meet Components", white paper, Microsoft.com (Jun. 1997).

"Implementing Locale As Dynamically Loaded Shared Object Files", ibm Technical Disclosure Bulletin, US, IBM Corp., New York, vol. 34, No. 12, pp. 117–118 XP000308454 ISSN: 0018–8689—the whole document.

Tripathi, A.R. et al.: Design Of A Remote Procedure Call System For Object–Oriented Distributed Programming, Software Practice & Experience, GB, John Wiley & Sons Ltd., Chichester, vol. 28, No. 1, pp. 23–47 XP000723715, ISSN: 0038–0644—the whole document.

Orfali et al., "RPC, Messaging, and Peer–to–Peer," *Essential Client/Server Survival Guide* chapter 9, pp. 119–128 (1994).

White Paper, "Java Remote Method Invocation–Distribution Computing For Java," java.sun.com (Jun. 24, 1998).

Chappell, "Microsoft Message Queue is a Fast, Efficient Choice for Your Distributed Application," *MSJ* 13:17–24 (Jul. 1998).

Bukovec and Dievendorff, "Use MSMQ and MTS to Simplify the Building of Transactional Applications," *MSJ* 13:27–40 (Jul. 1998).

"The Component Object Model: Technical Overview," http://www.microsoft.com/com/wpaper/Com_modl.html, pp. 1–17, 1996.

Skeen, "Enabling the Real–Time Enterprise," http://www.byte.com/art/9801/sec4/art5htm, pp. 1–9, Jan. 1998.

Brockschmidt, "Custom Components and the Component Object Model," *Inside OLE*, $2^{nd}$ Edition, pp. 219–276, 1995.

Brockschmidt, "In–Place Activation (Visual Editing™) and In–Place Containers," *Inside OLE*, $2^{nd}$ Edition, pp. 1011–1063, 1995.

Hackathorn, "Publish or Perish," http://www.byte.com/art/9709/sec6/art1htm, pp. 1–15, Sep. 1997.

"Chapter 9: Connectable Objects," http://www.microsoft.com/oledev/olecom/Ch09.htm, pp. 1–12, 1996.

Orfali et al., "COM: OLE's Object Bus," *The Essential Distributed Objects Survival Guide*, pp. 429–452, 1996.

Brockschmidt, "Local/Remote Transparency," *Inside OLE*, $2^{nd}$ Edition, pp. 277–338, 1995.

Montgomery, "Distributing Components," http://www.byte.com/art/9704/sec8/art1.htm, pp. 1–14, Apr. 1997.

"Monkey in the Middleware," http://www.byte.com/art/9802/sec12/art2.htm, pp. 1–2, Feb. 1998.

"Managing Performance/Reliability Trade–Offs," http://www.byte.com/art/9802/sec12/art3.htm, pp. 1–12, Feb. 1998.

Loshin, "Publish and Subscribe Meets the Internet," http://www.byte.com/art/9802/sec12art1htm, pp. 1–11, Feb. 1998.

Hackathorn, "Data Delivery When You Want It," http://www.byte.com/art/9706/sec4/art1.htm, pp. 1–8, Jun. 1997.

Hurwicz, "Multicast to the Masses," http://www.byte.com/art/9706/sec6/art6.htm, pp. 1–10, Jun. 1997.

Barkley, "Application Engineering in Health Care," pp. 1–7, May 9, 1995.

Hamilton (ed.), *JavaBeanc™*, Sun Microsystems, Version 1.01, pp. 1–114, Jul. 24, 1997.

Teegan, "Distributed Performance Monitoring Using SNMP V2.," *IEEE*, pp. 616–619, 1996.

McKay, "Microsoft Talks Up Tools," *InfoWorld*, vol. 20, No. 19, pp. 1 and 24, May 11, 1998.

Nance, "Balance the Load with Transaction Server," http://www.byte.com/art/9706/sec6/art1.htm, pp. 1–8, Jun. 1997.

Thacker, *Firefly: A Multiprocessor Workstation*, Digital Systems Research Center, pp. 1–13, 15, 17–18, Dec. 30, 1987.

Schroeder et al., *Performance of Firefly RPC*, Digital Equipment Corporation, pp. 1–15, Apr. 15, 1989.

King, *Inside Windows 95*, Microsoft Press, pp. 296–303, 1994.

Hackathorn, "Data Delivery When You Want It," http://www.byte.com/art/9706/sec4/art1.htm, pp. 1–7, Jun. 1997.

Schwartz et al., "Intel's Middleware Move: Company Ponders Initiatives for Common Object Services," *InfoWorld*, vol. 20, No. 9, pp. 1–2, Mar. 2, 1998.

Horstmann et al., *DCOM Architecture*, pp. 1–55, Jul. 23, 1997.

Loshin, "Publish and Subscribe Meets the Internet," http://www.byte.com/art/9802/sec12/art1.htm, pp. 1–10, Feb. 1998.

U.S. patent application Ser. No. 08/959,149, Limprecht et al., filed Oct. 28, 1997.

U.S. patent application Ser. No. 08/959,139, Helland et al., filed Oct. 28, 1997.

"Remote Method Invocation Specification," http://java.sun.com/products/jdk/1.1/docs/guide/rmi/spec/rmiTOC.doc.html, pp. 1–2, 1997.

"Introduction," http://java.sun.com/products/jdk/1.1/docs/guide/rmi/spec/rmi–intro.doc/html, pp. 1–2, 1997.

"Java Distributed Object Model," http://java.sun.com/products/jdk/1.1/docs/guide/rmi/spec/rmi–objmodel.doc.html, pp. 1–7, 1997.

"System Architecture," http://java.sun.com/products/jdk/1.1/docs/guide/rmi/spec/rmi–client.doc.html, pp. 1–3, 1997.

"Client Interfaces," http://java.sun.com/products/jdk/1.1/docs.guide/rmi/spec/rmi–client.doc.html, pp. 1–3, 1997.

"Server Interfaces," http://www.java.sun.com/products/jdk/1.1/docs/guide/rmi/spec/rmi–server.doc.html, pp. 1–10, 1997.

"Registry Interfaces," http://www.java.sun.com/products/jdk/1.1/docs/guide/rmi–stubs.doc.html, pp. 1–3, 1997.

"Stub/Skeleton Interfaces," http://java.sun.com/products/jdk/1.1/docs/guide/rmi/spec/rmi–stubs.doc.html, pp. 1–4, 1997.

"Garbage Collector Interfaces," http://java.sun.com/products/jdk/1.1/docs/guide/rmi/spec/rmi–dgc.doc.html, pp. 1–5, 1997.

"RMI Wire Protocol," http://java.sun.com/products/jdk/1.1/docs/guide/rmi/spec/rmi–protocol.doc.html, pp. 1–9, 1997.

"Exceptions in RMI," http://java.sun.com/products/jdk/1.1/docs/guide/rmi/spec/rmi–exceptions.doc.html, pp. 1–3, 1997.

"Properties in RMI," http://java.sun.com/products/jdk/1.1/docs/guide/rmi/spec/rmi–properties.doc.html, p. 1, 1997.

Orfali et al., *Essential Client/Server Survival Guide*, pp. 241–288, 1994.

Nierstrasz, "Active Objects in Hybrid," *OOPSLA '87*, vol. 22, No. 12, pp. 243–253, Dec. 1987.

Kiczales, "Aspect–Oriented–Programming," http://www.parc.xerox.com.spl/projects/aop/invited–talk/, 86 pp., 1997.

Lam, "Building Scalable Apps," *PC Magazine*, pp. 209–210, and 212–214, Apr. 21, 1998.

"White Paper, DCOM Technical Overview," Microsoft Corporation, pp. 1–43, Apr. 1998.

Orfali et al., "CORBA Services: System Management and Security," *Essential Client/Server Survival Guide*, pp. 183–202, 1994.

Matena et al., *Enterprise JavaBeans™*, Version 1.0, Sun Microsystems, pp. 1–95, 97–145, and 147–181, Mar. 21, 1998.

Hamilton (ed.), "Events," *Sun Microsystems JavaBeans™*, pp. 24–39, Jul. 24, 1997.

"CORBA Overview," *The Common Object Request Broker: Architecture and Specification*, Version 2.0, pp. 2–1 through 2–17, Jul. 1995.

*The Common Object Request Broker: Architecture and Specification*, Version 2.0, pp. 4–12 through 4–16, Jul. 1995.

Bower, "Intel's Middleware Move," *InfoWorld*, vol. 20, No. 9, pp. 1–2, 1998.

Brockschmidt, "An Overview of OLE," *Inside OLE*, $2^{nd}$ Edition, pp. 3–60, 1995.

Brockschmidt, *Inside OLE*, $2^{nd}$ Edition, pp. 248–251, 1995.

Grimes, "Security," *DCOM Programming*, pp. 319–389, 1997.

Mens et al., "Aspect–Oriented Programming Workshop Report," *Proceedings of the Aspect–Oriented Programming Workshop at ECOOP '97*, 14 pp., 1997.

Aksit, "Issues in Aspect–Oriented Software Development," *Proceedings of the Aspect–Oriented Programming Workshop at ECOP '97*, 7 pp., 1997.

Czarnecki et al., "Beyond Objects: Generative Programming," *Proceedings of the Aspect–Oriented Programming Workshop at ECOOP '97*, 8 pp. 1997.

De Meuter, "Monads as a Theoretical Foundation for AOP," *Proceedings of the Aspect–Oriented Programming Workshop at ECOOP '97*, 6 pp., 1997.

Dempsey et al., "Aspects of System Support for Distributed Computing," *Proceedings of the Aspect–Oriented Programming Workshop at ECOOP '97*, 6 pp., 1997.

Hernández et al., "Coordinating Concurrent Objects: How to Deal with the Coordination Aspect?," *Proceedings of the Aspect–Oriented Programming Workshop at ECOOP '97*, 6 pp., 1997.

Holmes et al., "Aspects of Synchronisation," *Proceedings of the Aspect–Oriented Programming Workshop at ECOOP '97*, 6 pp., 1997.

Lamping, "The Interaction of Components and Aspects," *Proceedings of the Aspect–Oriented Programming Workshop at ECOOP '97*, 1 pp. 1997.

Matthijs et al., "Aspects Should Not Die," *Proceedings of the Aspect–Oriented Programming Workshop at ECOOP '97*, 55 pp., 1997.

Müller, "draft: Aspect–Design in the Building–Block Method," *Proceedings of the Aspect–Oriented Programming Workshop at ECOOP '97*, 3 pp. 1997.

Harrison et al., "The Beginnings of a Graphical Environment for Subject–Oriented Programming," *Proceedings of the Aspect–Oriented Programming Workshop at ECOOP '97*, 2 pp., 1997.

Thorup, "Contextual Class Extensions," *Proceedings of the Aspect–Oriented Programming Workshop at ECOOP '97*, 1997.

VanHilst, "Subcomponent Decomposition as a Form of Aspect Oriented Programming," *Proceedings of the Aspect–Oriented Programming Workshop at ECOOP '97*, 2 pp., 1997.

Van Roy et al., "Using Mobility to Make Transparent Distribution Practical," *Proceedings of the Aspect–Oriented Programming Workshop at ECOOP '97*, 18 pp., 1997.

Werner, "Email Thoughts," *Proceedings of the Aspect–Oriented Programming Workshop at ECOOP '97*, 1 pp., 1997.

Aksit et al., "Solving the Modeling Problems of Object–Oriented Languages by Composing Multiple Aspects Using Composition Filters," *Proceedings of the Aspect–Oriented Programming Workshop at ECOOP '98*, 7 pp., 1998.

Bardou, "Roles, Subjects and Aspects: How Do They Relate?," *Proceedings of the Aspect–Oriented Programming Workshop at ECOOP '98*, 7 pp., 1998.

Becker, "$D^2AL$," *Proceedings of the Aspect–Oriented Programming Workshop at ECOOP '98*, 7 pp., 1998.

Berger et al., "Interactions Between Objects: An Aspect of Object–Oriented Languages," *Proceedings of the Aspect–Oriented Programming Workshop at ECOOP '98*, 6 pp., 1998.

Blair et al., "The Impact of Aspect–Oriented Programming on Formal Methods," *Proceedings of the Aspect–Oriented Programming Workshop at ECOOP '98*, 6 pp., 1998.

Blank et al., "Aspects of Enterprise Java Beans," *Proceedings of the Aspect–Oriented Programming Workshop at ECOOP '98*, 4 pp., 1998.

Böllert, "Aspect–Oriented Programming Case Study: System Management Application," *Proceedings of the Aspect–Oriented Programming Workshop at ECOOP '98*, 4 pp., 1998.

Buhr, "A Possible Design Notation for Aspect Oriented Programming," *Proceedings of the Aspect–Oriented Programming Workshop at ECOOP '98*, 11 pp., 1998.

Fabry, "Replication as an Aspect," *Proceedings of the Aspect–Oriented Programming Workshop at ECOOP '98*, 6 pp., 1998.

Fradet et al., "AOP: Towards a Generic Framework Using Program Transformation and Analysis," *Proceedings of the Aspect–Oriented Programming Workshop at ECOOP '98,* 6 pp., 1998.

Hauck et al., "*AspectIX:* A Middleware for Aspect–Oriented Programming," *Proceedings of the Aspect–Oriented Programming Workshop at ECOOP '98*, 5 pp., 1998.

Holmes et al., "Towards Reusable Synchronisation for Object–Oriented Languages," *Proceedings of the Aspect–Oriented Programming Workshop at ECOOP '98*, 10 pp., 1998.

Kendall, "Agent Roles and Aspects," *Proceedings of the Aspect–Oriented Programming Workshop at ECOOP '98*, 7 pp., 1998.

Lopes et al., "Recent Developments in AspectJ™," *Proceedings of the Aspect–Oriented Programming Workshop at ECOOP '98*, 4 pp., 1998.

Lorenz et al., "Visitor Beans: An Aspect–Oriented Pattern," *Proceedings of the Aspect–Oriented Programming Workshop at ECOOP '98*, 8 pp., 1998.

Lunau, "Is Composition of Metaobjects=Aspect Oriented Programming," *Proceedings of the Aspect–Oriented Programming Workshop at ECOOP '98*, 4 pp., 1998.

Kenens et al., "An AOP Case with Static and Dynamic Aspects," *Proceedings of the Aspect–Oriented Programming Workshop at ECOOP '98*, 6 pp., 1998.

Nebbe, "Coordination and Composition: *The Two Paradigms Underlying AOP?,*" *Proceedings of the Aspect–Oriented Programming Workshop at ECOOP '98*, 5 pp., 1998.

Ossher et al., "Operation–Level Composition: A Case in (Join) Point," *Proceedings of the Aspect–Oriented Programming Workshop at ECOOP '98*, 4 pp., 1998.

Sánchez et al., "Run–Time Adaptability of Synchronization Policies in Concurrent Object–Oriented Languages," *Proceedings of the Aspect–Oriented Programming Workshop at ECOOP '98*, 6 pp., 1998.

Tekinerdogan et al., "Deriving Design Aspects from Canonical Models," *Proceedings of the Aspect–Oriented Programming Workshop at ECOOP '98*, 7 pp., 1998.

Walker et al., "Assessing Aspect–Oriented Programming and Design: Preliminary Results," *Proceedings of the Aspect–Oriented Programming Workshop at ECOOP '98*, 6 pp., 1998.

Volder, "Aspect–Oriented Logic Meta Programming," *Proceedings of the Aspect–Oriented Programming Workshop at ECOOP '98*, 6 pp., 1998.

Orfali et al., "RPC, Messaging, and Peer–to–Peer," *Essential Client/Server Survival Guide* chapter 9, pp. 119–128 (1994).

White Paper, "Java Remote Method Invocation–Distribution Computing For Java," java.sun.com (Jun. 24, 1998).

Chappell, "Microsoft Message Queue is a Fast, Efficient Choice for Your Distributed Application," *MSJ* 13: 17–24 (Jul. 1998).

Bukovec and Dievendorff, "Use MSMQ and MTS to Simplify the Building of Transactional Applications," *MSJ* 13:27–40 (Jul. 1998).

* cited by examiner

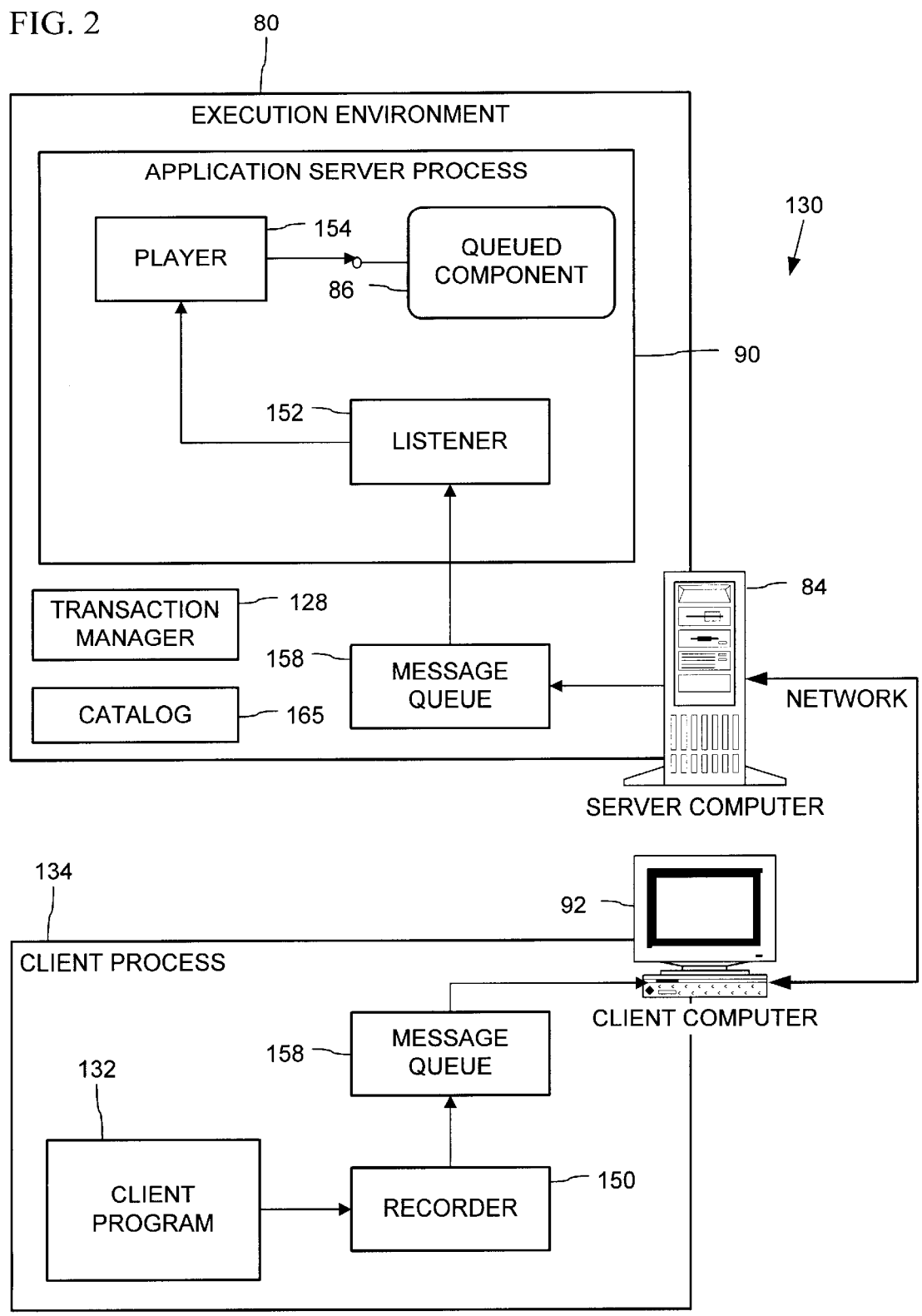

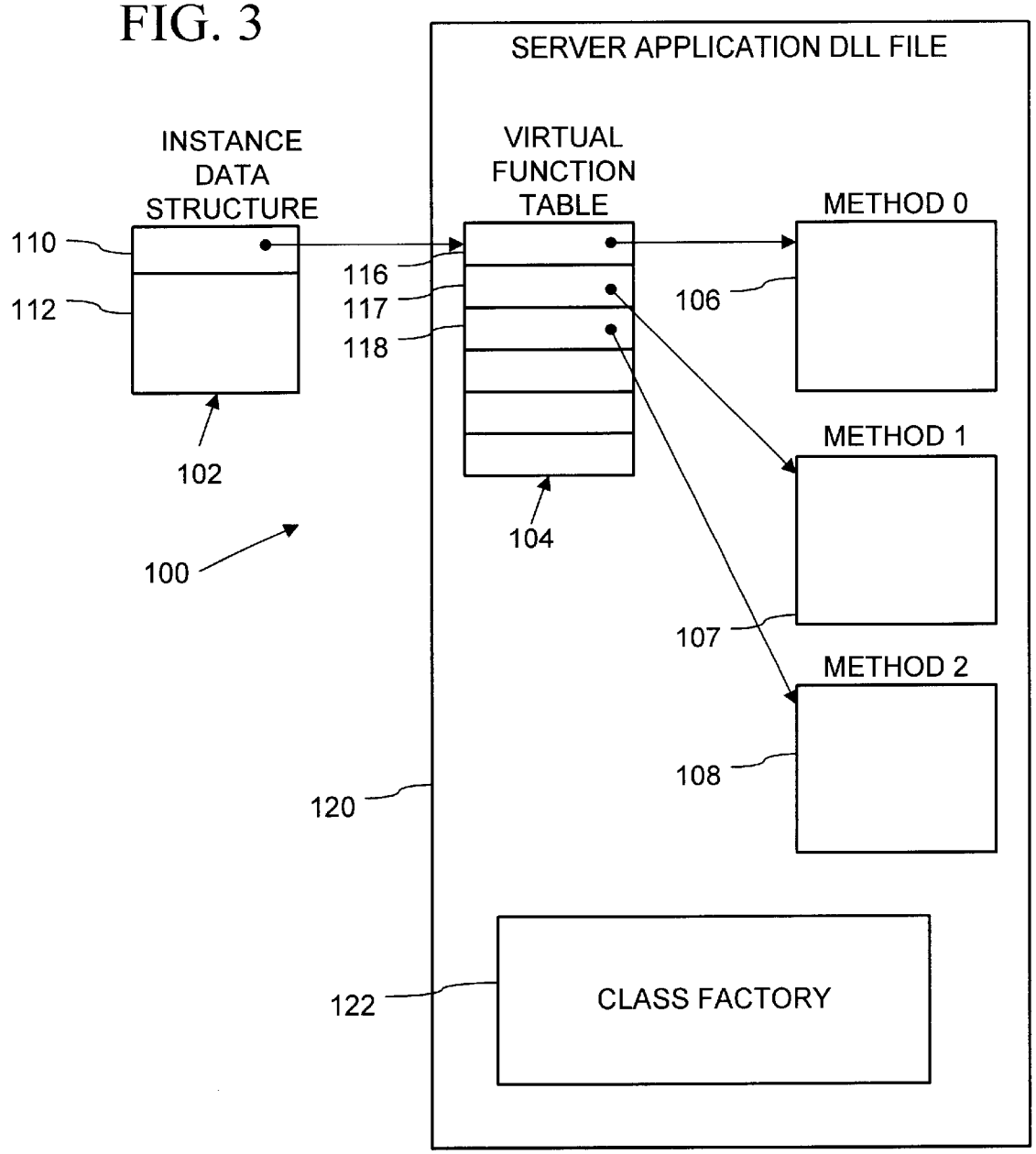

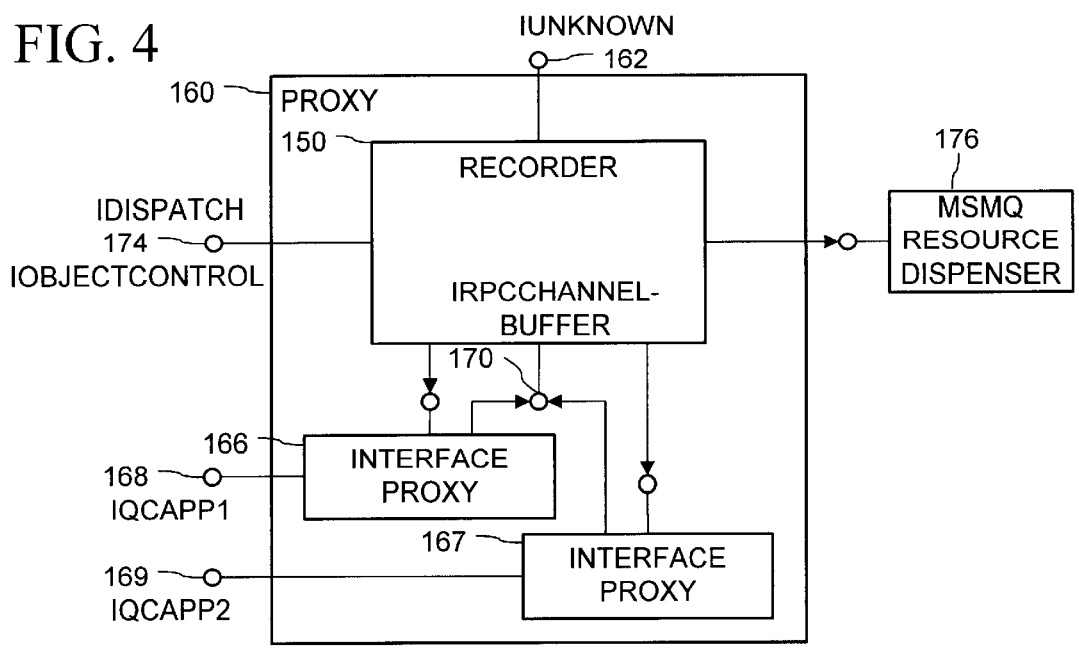
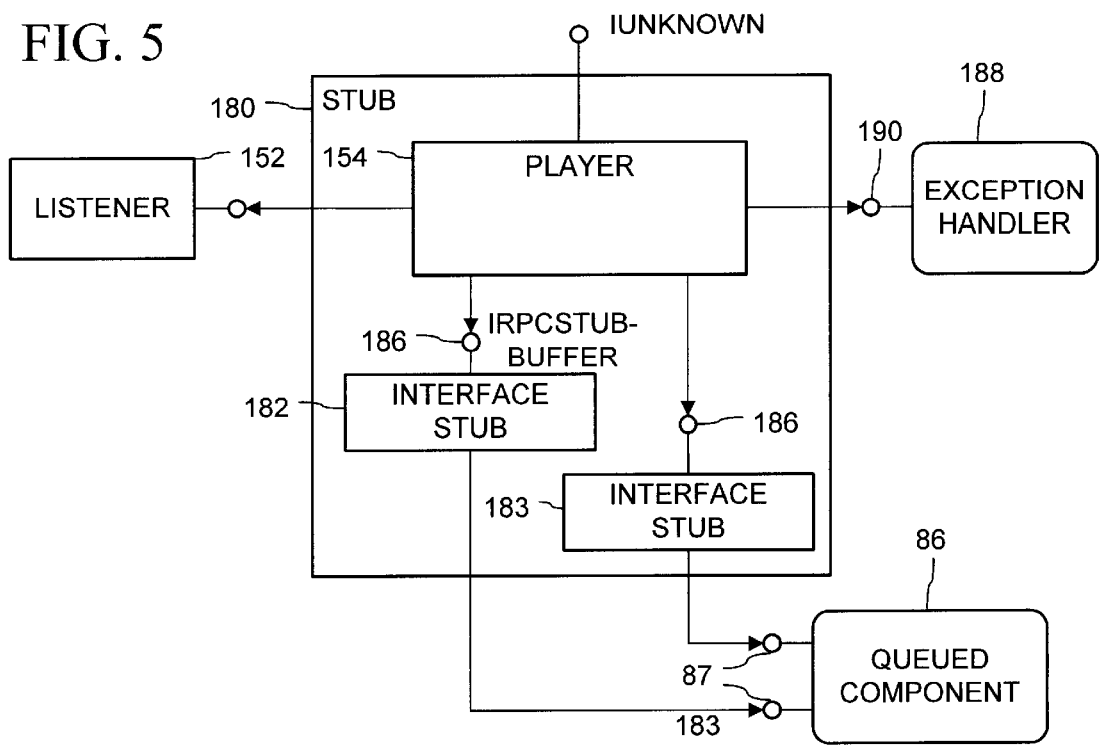

FIG. 6

194 — DEAD LETTER QUEUE MONITOR → 190 → EXCEPTION HANDLER 188

FIG. 7

159
```
CoGetObject(L"queue:/new:Ship", 0, IID_IShip, (void **)&pShip);

CoGetObject(L"queue:/new:812DF40E-BD88-11D0-8A6D-
00C04FC340EE", 0, IID_IShip, (void**)&pShip);

CoGetObject(L"queue:/new:{812DF40E-BD88-11D0-8A6D-
00C04FC340EE}", 0, IID_IShip, (void**)&pShip);

CoGetObject(L"new:Ship", 0, IID_IShip, (void **)&pShip);

CoCreateInstance( CLSID_Ship, NULL, CLSCTX_ALL,
IID_IShip, (void **)&pShip);
```

FIG. 8

200
```
interface IPlaybackControl : IUnknown
{
        HRESULT FinalClientRetry();
        HRESULT FinalServerRetry();
}
```

FIG. 9

```
typedef struct _CommonHeader
{       INT   TypeOfHeader;      // Type of header
        INT   SizeOfBlock; // size of the header +
                                        // associated data
} COMMON_HEADER;

typedef struct _ContainerHeader : COMMON_HEADER
{       //the fixed part of the container header
        GUID  guidSignature;
An IStream form of a moniker that can activate the server object.
} CONTAINER_HEADER;

typedef struct _ShortMethodHeader : COMMON_HEADER
{       INT   MethodId;
        RPCOLEDATAREP dataRepresentation;
        INT   RpcFlags;
        INT   cbVariableData;
        INT   UsingInterceptor;
        INT   Padding;
} SHORTMETHOD_HEADER;

typedef struct _MethodHeader : SHORTMETHOD_HEADER
{       IID iid; // interface to be invoked
} METHOD_HEADER;

typedef struct _SecurityHeader : COMMON_HEADER
{       INT cbVariableData;       // data length without padding
        INT Padding;      // pad to 8-byte boundary
} SECURITY_HEADER;

typedef struct _SecurityRefHeader : COMMON_HEADER
{       INT SecurityHeaderOffset;
        INT Padding; // pad to 8-byte boundary
} SECURITYREF_HEADER;
```

QUEUED METHOD INVOCATIONS ON DISTRIBUTED COMPONENT APPLICATIONS

TECHNICAL FIELD

The present invention relates to distributed component-based computer software applications, and more particularly relates to queued method invocations on such applications.

BACKGROUND OF THE INVENTION

In many information processing applications, a server application running on a host or server computer in a distributed network provides processing services for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations. This is sometimes referred to as client/server computing.

In a form of client/server computing sometimes known as "distributed objects," the server application is developed as a set of components conforming to an object-oriented programming (OOP) model, such as the Microsoft Component Object Model (COM) and Distributed Component Object Model (DCOM), the IBM System Object Model (SOM), the Object Management Group's Common Object Request Broker Architecture (CORBA), and others. Object-oriented programming generally has advantages in ease of programming, extensibility, reuse of code, and integration of software from different vendors and (in some object-oriented programming models) across programming languages.

In object-oriented programming, programs are written as a collection of object classes which each model real world or abstract items by combining data to represent the item's properties with methods (e.g., program functions or procedures) to represent the item's functionality. More specifically, an object is an instance of a programmer-defined type referred to as a class, which exhibits the characteristics of data encapsulation, polymorphism and inheritance.

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related methods of the object. In other words, the client programs do not access the object's data directly, but must instead call methods on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

In client/server computing with "distributed objects," the client program on the user's computer typically uses "real-time" or synchronous processing mechanisms to remotely invoke methods on the server application's objects that reside on the server computer, such as the remote procedure call ("RPC"). In a typical remote procedure call, object services of the operating system compile an interface definition language description of a server application object to generate a local "proxy" for the server application object on the client computer. The client software invokes methods of the remote server application object by issuing ordinary local procedure calls directly to the proxy. The proxy, in turn, utilizes RPC services to convey the procedure call to the actual server application object on the remote server computer. The RPC services marshal values for call parameters into a network message, and send the message via network protocols to the server computer. At the server computer, the RPC services unmarshal the call parameters and issue the call to the proper server application object method. The RPC services also marshal and unmarshal return values from the server application object method back to the client program via a network message.

The RPC services thus handle all the intricacies of network communications effectively "behind the scene," such that the client program invokes the remote method in a similar manner to making a local procedure call. Like a local procedure call, execution of the client program is suspended (also known as "blocking") during the RPC method invocation until the method completes and returns. This results in a synchronous flow of execution among the client program and server application objects.

Although appropriate to many applications, real-time method invocation models like the RPC fail to adequately meet the needs of other applications due to a number of limitations as to availability, network transmission costs, lack of priority, object lifetime, and reference locality.

As to availability, real-time method invocation models require that the server application object is available at the time that the client program issues a call to one of the object's methods. If not available, then the real-time method invocation cannot take place. In reality however, server application objects may not be available due to network failures, or due to the server computer being overloaded with work. In some cases, the server computer may be off-line for a certain duration (e.g., due to upgrades or maintenance), or may only come on line at certain times of the day. Further, if any server application object is not available in "real time," no part of the work (including by available server application objects) can complete. This problem is exacerbated in the case of complex operations involving multiple nodes (i.e., computers on a network). For example, a process that requires access to four independent objects on separate nodes each available about 90% of the time, is actually available only about 66% of the time (since $90\%^4=65.61\%$).

Additionally, some client computers are only occasionally connected to a network, and thus unable to issue real-time method invocations for a majority of the time. A good example of such occasionally connected client computers are laptops, notebooks and handheld computers of mobile users, which are estimated to now make up more than 50% of new computer purchases.

The availability requirement of the real-time method invocation model also means that the server computer(s) must be configured with sufficient capacity to handle the peak demands by interactive users of the server application. As a result, the typical system is configured with server computers that are underutilized most of the time, and are still over-utilized at other times (e.g., when actual load exceeds expectations).

For these reasons, the real-time method invocation model is not well suited to computing environments with limited availability, mobile users, large number of nodes, or high variance interactive user loads.

As to network transmission costs, each real-time method invocation via an RPC requires a round-trip network communication which imposes significant network transmission costs, such as processing time for marshaling and unmarshaling of call parameters, processing in the network protocol stack, and transmission time. Moreover, the client may need to invoke many methods of a server application component to perform useful work, thus multiplying the network transmission costs. Modern object-oriented design techniques, in particular, tend to result in many procedure calls with relatively few parameters in each call. A typical such object, for example, is designed such that a client first calls several "property set" methods to set up an operation, and then invokes a method to process the operation. Consequently, a large amount of the time can be spent in network overhead. These network transmission costs can render real-time method invocation models less suitable to some applications.

As to priority, calls according to typical real-time method invocation models are handled as they arrive on a "first-come, first-served" basis, without any notion of priority.

As to object lifetime, server application objects tend to have long lifetimes in real-time method invocation models. In typical distributed-object client/server computing, the server application object exists on the server computer from the time of creation by the client until the object is released. The object spends much of this time simply waiting for the client to invoke the object's methods, and on the network transmission costs from returning method results until a next method invocation from the client. Meanwhile, the object consumes server computer resources, including memory and processing overhead of the execution environment. The server application object effectively "wakes up" and "sleeps" at least once per method call. This server application object "occupancy time" is an impediment to rapid cycling of server objects, and limits server application scalability.

As to reference locality, many parts of computer systems (e.g., the processor cache and the virtual memory working set) rely on reference locality to achieve performance gains. Highly localized applications, e.g., objects or application code that execute straight through using locally available data, therefore have reference patterns that yield better performance. By contrast, applications with objects distributed over multiple server computers that use real-time method invocations like the RPC have poor reference locality. For example, a server object is created by the first real-time method call, and often spends much of its lifetime awaiting subsequent real-time method calls. After processing each method call, the server object is typically displaced from the processor cache and sometimes falls out of the system's virtual memory working set between calls. The real-time method invocations thus limit the application's transaction processing volume.

An alternative to "distributed objects" that addresses some of the availability limitations of a real-time RPC method invocation is a form of client/server computing sometimes known as "message oriented middleware" (MOM). In MOM, a client application communicates with a remote server application by sending messages to a message queue. The server application, which may run at a later time than the client application, retrieves and processes the messages from its message queue. The server application can return results of this processing to the client application by sending messages to a same or separate message queue for processing by the client application. Such queued messaging has the advantage that the client and server applications need not be available simultaneously, and need not have concurrent lifetimes.

Traditional MOM products, however, also have a number of limitations. One limitation is that the client application and server application typically formats the messages on their own as a linear stream. More specifically, the client and server applications must provide their own marshaling and unmarshaling of data from this stream. No marshaling support is provided in the queued messaging infrastructure.

A further limitation of the traditional MOM is that the client application and server application communicate to the queued messaging infrastructure using a vendorspecific message queuing application programming interface (API). In other words, the client application and server application send messages to a message queue via explicit calls to the message queuing API. This is yet another set of APIs for developers of the client/server applications to learn. For example, the MQI (for MQSeries API) is the API of IBM's MQSeries message oriented middleware product. Other MOM product vendors, e.g., Microsoft (Microsoft Message Queue (MSMQ)), Covia (Communications Integrator), Peerlogic (PIPES), Horizon Strategies (Message Express), and System Strategies (ezBridge), have different message queuing APIs.

Additionally, customers of a MOM product (such as, an information technology (IT) organization) for various reasons create a separate API layer over the vendor-provided message queuing API. One reason is that the IT organization doesn't want its application developers deciding which parts of the message queuing API to use and how to use the API. A second reason is that the vendor's message queuing API is too rich, too complex, or offers too many options to the application developers. The IT organization thus creates their own API layer in an effort to simplify the API for its application developers. As a result, most of the developers are forced to learn both the vendor's message queuing API and the IT-provided API. A third reason is that the IT organization doesn't want its applications to be dependent on any one vendor's message queuing API or MOM product, and hopes to retain the flexibility to switch vendors at a future time. This often prevents the IT organization from fully exploiting the features of the MOM product. This phenomenon delays implementation of applications with a MOM product and sometimes makes it difficult for the IT organization to exploit newly introduced features of the MOM product.

Yet another limitation of traditional MOM products is sub-optimal performance in some configurations. In particular, applications and application objects can communicate locally via method calls with extremely low processing time cost, especially when in a same process. Applications and application objects that communicate through a message queuing API require processing through a queue manager, even if the applications or objects are in the same or similar environments, such as a same process.

SUMMARY OF THE INVENTION

The present invention provides a capability for a client of an object to issue and the object to receive method invocations on a queued basis using normal call semantics of an object model, without use of a message queuing API. More specifically, the client uses the normal semantics of the object model to create the object, call the object's methods, and release the object. The object framework or execution environment supplies services to automatically queue the method invocations, and at a potentially later time issue the queued method invocations to the object. Meanwhile, the client is allowed to continue execution asynchronously from the invoked method. The object, in turn, has the queued method invocations issued to its interface(s) per normal call semantics, and processes then returns a value from the method again using normal call semantics. The application developer thus need not program the client and the object to use a message queuing API for queued processing as per traditional message oriented middleware, and avoids the need to learn such APIs.

According to one aspect of the invention, an object can receive both real-time and queued method invocations on a common interface. Real-time method invocations are delivered to the object via a local procedure call or remote procedure call to the interface. Queued method invocations are queued in a queued method invocation facility, then delivered via a local procedure call from the facility to the object's interface. No distinction between the real-time and queued method invocations is apparent to the object. The object therefore can be run in either a real-time synchronous environment or a queued asynchronous environment without modification. The object is figuratively "unaware" of the real-time or queued nature of its environment, and "agnostic" as to the manner in which the methods on its interface are invoked.

According to another aspect of the invention, the object framework or environment also provides automatic marshaling support for queued method invocations. A client issues queued method invocations to an object via a system-provided proxy and stub or wrapper that is compiled from an interface definition language description of the object's interface to implement appropriate marshaling of call parameters and related data to and from queued messages.

According to yet another aspect of the invention, the method invocation queuing facility includes a method invocation recorder at a client-side and a method invocation player at the object-side of the client-object interaction. The method invocation recorder receives a set of possibly more than one method invocations from a client to be forwarded as a batch to the method invocation player. For example, the recorder can collect a number of queued method invocations made by the client on the object as part of a transaction, and not forward the method invocations until the transaction commits. The method invocation player retrieves the queued method invocations in order from a method invocation queue, and issues the method invocations to the object—potentially as part of another transaction involving the object.

According to a further aspect of the invention, an object that supports queued method invocations conforms to the limitation that its methods may have only input parameters and may not return application-specific information. The queued method invocations can then be issued as one-way communications from the client to the object that do not require the client to wait in real-time or synchronous execution for results of the method invocation. The object can provide results of processing the queued method invocations by issuing real-time or queued method invocations to a results object specified by an input parameter from the client.

Additional features and advantages of the invention will be made apparent from the following detailed description of an illustrated embodiment which proceeds with reference to the accompanying drawings.

BRIEF DESCRIPTION OF THE DRAWINGS

FIG. 2 is a block diagram of an execution environment and runtime architecture for queued method invocations according to the illustrated embodiment of the invention FIG. 3 is a block diagram of a structure of a queued component in the execution environment of FIG. 2.

FIG. 4 is a block diagram of a recorder and proxy in the runtime architecture of FIG. 2.

FIG. 5 is a block diagram of a player and stub in the runtime architecture of FIG. 2.

FIG. 6 is a block diagram of a dead letter queue monitor and exception handler in the runtime architecture of FIG. 2.

FIG. 7 is a program listing of exemplary object instantiation calls for activating the queued component in the runtime architecture of FIG. 2.

FIG. 8 is a program listing of an "PlaybackControl" interface of an exception handler in FIGS. 5 and 6.

FIG. 9 is a program listing of a format of a queued method invocations message in the runtime architecture of FIG. 2.

DETAILED DESCRIPTION OF THE INVENTION

The present invention is directed toward a method and system for queued component method invocations. In one embodiment illustrated herein, the invention is incorporated into an object services component, entitled "COM+," of an operating system, entitled "Microsoft Windows NT Server 5.0," marketed by Microsoft Corporation of Redmond, Wash. Briefly described, this software is a scaleable, high-performance network and computer operating system supporting distributed client/server computing, and providing an object execution environment for component applications conforming to the Microsoft Component Object Model (COM). The COM+ component incorporates object services from prior object systems, including Microsoft Component Object Model (COM), Microsoft Object Linking and Embedding (OLE), Microsoft Distributed Component Object Model (DCOM), and Microsoft Transaction Server (MTS).

Exemplary Operating Environment

Figure 1:
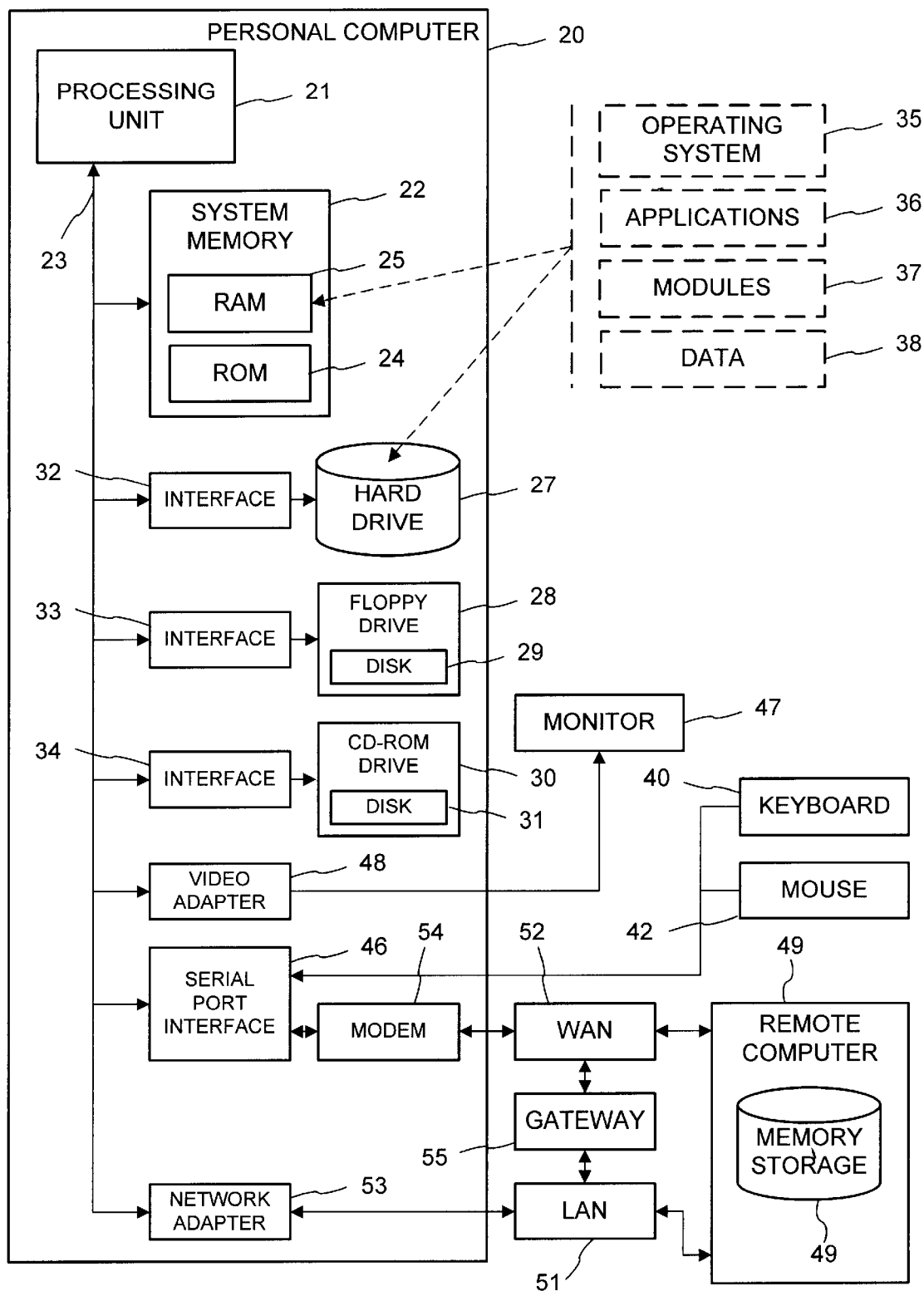
FIG. 1 is a block diagram of a computer system that may be used to implement a method and apparatus embodying the invention for queued method invocations.

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional computer 20 (such as personal computers, laptops, palmtops, settops, servers, mainframes, and other variety computers), including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a server, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Component Application Execution Environment

With reference now to FIG. 2, the above-mentioned COM+ component of the Microsoft Windows NT 5.0 operating system provides run-time or system services to create a run-time object execution environment 80 on a server computer 84 that automatically provides queued method invocations to an object 86 (hereafter the "queued component"). The COM+ component is implemented as a dynamic link library ("DLL"). (A DLL is a well-known executable file format which allows dynamic or run-time linking of executable code into an application program's process.) The COM+ DLL is loaded directly into application server processes (e.g., "ASP" 90) that host component application objects, and runs transparently in the background of these processes.

The illustrated ASP 90 is a system process that hosts execution of component application objects, including the queued component 86. Each ASP 90 can host multiple component application objects that are grouped into a collection called a "COM+ Application" (also called a "package" in the prior Microsoft Transaction Server object execution environment). Also, multiple ASPs 90 can execute on the server computer 84 under a multi-threaded, multi-tasking operating system (e.g., Microsoft Windows NT in the illustrated embodiment). Each ASP 90 provides a separate trust boundary and fault isolation domain for the server application objects. In other words, when run in separate ASPs, a fault by one server application object which causes its ASP to terminate generally does not affect the server application objects in another ASP. In the illustrated embodiment, component application objects are grouped as a COM+ Application to be run together in one ASP 90 using an administration utility called "the COM+ Explorer." This utility provides a graphical user interface for managing attributes associated with component application objects, including grouping the objects into COM+ Applications.

In a typical installation shown in FIG. 2, the execution environment 80 is on the server computer 84 (which may be an example of the computer 20 described above) that is connected in a distributed computer network 91 comprising a large number of client computers 92 which access the component application objects in the execution environment 80. Alternatively, the execution environment 80 may reside on a single computer and host component application objects accessed by client processes also resident on that computer.

Component Application Objects Overview

With reference to FIG. 2, the computer 84 executes component applications that are developed as a COM+ Application containing a group of component application objects. For example, the component application objects (such as, the queued component 86) that are hosted in the execution environment 80 of the ASP 90 may implement the business logic of a client/server application, such as the code to manage class registrations in a university's registration application or orders in an on-line sales application. Typically, each component application comprises multiple components, each of which contains program code for a portion of the application's work.

Turning to FIG. 3, the component application objects in the illustrated execution environment 80 (FIG. 2) conform to the Microsoft Component Object Model ("COM") specification (i.e., are implemented as a "COM Object" 100) and are executed using the COM+ services of the Microsoft Windows NT Server 5.0 operating system as stated above, but alternatively may be implemented according to other object standards (including the CORBA (Common Object Request Broker Architecture) specification of the Object Management Group, and Java Beans by Sun Microsystems, Inc.) and executed under object services of another operating system. The COM specification defines binary standards for objects and their interfaces which facilitate the integration of software components into applications. (For a detailed discussion of COM and OLE, see Kraig Brockschmidt, *Inside OLE, Second Edition*, Microsoft Press, Redmond, Wash. (1995)).

In accordance with COM, the COM object 100 is represented in the computer 84 (FIG. 2) by an instance data structure 102, a virtual function table 104, and methods or member functions 106–108. The instance data structure 102 contains a pointer 110 to the virtual function table 104 and data 112 (also referred to as data members, or properties of the object). A pointer is a data value that holds the address of an item in memory. The virtual function table 104 contains entries 116–118 for the methods 106–108. Each of the entries 116–118 contains a reference to the code 106–108 that implements the corresponding method.

The pointer 110, the virtual function table 104, and the methods 106–108 implement an interface of the COM object 100. By convention, the interfaces of a COM object are illustrated graphically as a plug-in jack as shown for the queued component 86 in FIG. 2. Also, interfaces conventionally are given names beginning with a capital "I." In accordance with COM, the COM object 100 can include multiple interfaces, which are implemented with one or more virtual function tables. The method of an interface is denoted as "IInterfaceName::FunctionName."

The virtual function table 104 and methods 106–108 of the COM object 100 are provided by an object server program 120 (hereafter "object server DLL") which is stored in the computer 20 (FIG. 1) as a dynamic link library file (denoted with a ".dll" file name extension). In accordance with COM, the object server DLL 120 includes code for the virtual function table 104 and methods 106–108 of the classes that it supports, and also includes a class factory 122 that generates the instance data structure 102 for an object of the class.

Other objects and programs (referred to as a "client" of the COM object 100) access the functionality of the COM object by invoking the methods through the COM object's interfaces. First however, the COM object must be instantiated (i.e., by causing the class factory to create the instance data structure 102 of the object); and the client must obtain an interface pointer to the COM object.

Before the COM object 100 can be instantiated, the object is first installed on the computer 20. Typically, installation involves installing a group of related objects contained in a COM+ Application. The COM object 100 is installed by storing the object server DLL file(s) 120 that provides the object in data storage accessible by the computer (typically the hard drive 27, shown in FIG. 1), and registering COM attributes (e.g., class identifier, path and name of the object server DLL file 120, etc.) of the COM object in a system registry, a catalog, or like configuration database.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the Microsoft Windows NT Server 5.0 operating system in a file named "OLE32.DLL." Also in COM+, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateGUID" (or any of several other APIs and utilities that are used to create universally unique identifiers) and assigns to the respective classes. The interfaces of a component additionally are associated with interface identifiers ("IIDs").

In particular, the COM+ library provides API functions, e.g., "CoCreateInstance( )" and "CoGetObject( )," that the client program can call to request creation of a component using its assigned CLSID and an IID of a desired interface. In response to a client's instantiation request, the "CoCreateInstance( )" API looks up the registry entry of the requested CLSID in the registry to identify the executable file for the class. The "CoCreateInstance( )" API function then loads the class' executable file, and uses the class factory in the executable file to create an instance of the COM object 100. Finally, the "CoCreatelnstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 100 in the system registry. The "CoGetObject( )" API, on the other hand, uses the COM Moniker Architecture to parse a string that identifies the server object class, and create a moniker object that is then used to create an instance of the server object class.

Once the client of the COM object 100 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a method named "QueryInterface( )." The "QueryInterface( )" function can be called with an interface identifier as an argument, and returns a pointer to the interface associated with that interface identifier. The "IUnknown" interface of each COM object also includes methods, "AddRef( )" and "Release( )", for maintaining a count of client programs holding a reference (e.g., an interface pointer) to the COM object. By convention, the "IUnknown" interface's methods are included as part of each interface on a COM object. Thus, any interface pointer that the client obtains to an interface of the COM object 100 can be used to call the QueryInterface function.

Transaction Processing Overview

With reference again to FIG. 2, the COM+ component also implements automatic transaction processing for the component application objects in the illustrated execution environment 80. Automatic transaction processing is disclosed more fully in Helland et al., "Automatic Transaction Processing Of Component-Based Server Applications," U.S. patent application Ser. No. 08/959,141, filed Oct. 28, 1997 (hereafter the "Automatic Transactions Patent Application"), the disclosure of which is incorporated herein by reference. Briefly, the automatic transaction processing automatically coordinates component application objects' processing activities in the execution environment 80 that form parts of an operation so as to take effect as a single indivisible unit of work, commonly referred to as a transaction.

Transactions in the execution environment 80 are managed by a transaction manager 128. The transaction manger 128 is a system service that coordinates transactions involving multiple managed transactional resources, such as databases, file systems, etc. The transaction manager 128 ensures that all processing work (e.g., database updates) involved in a transaction occurs in conformance with the ACID properties (Atomicity, Consistency, Isolation, Durability) using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5. For additional background information on transaction processing, see, inter alia, Jim Gray and Andreas Reuter, *Transaction Processing Concepts and Techniques,* Morgan Kaufmann, 1993.

Queued Components Runtime Architecture

With reference still to FIG. 2, a queued component runtime architecture 130 (hereafter "QC architecture") provides support for queued method invocations using normal COM call semantics. More specifically, a client 132 in a process 134 on the client computer 92 invokes methods on interfaces 87 of the queued component 86 using the usual COM conventions for real-time synchronous interaction with an in-process COM object, including: creating the object, such as via a "CoGetObject( )" or "CoCreatelnstance( )" call; obtaining an interface pointer, such as by specifying an interface identifier (IID) in a "CoCreateInstance( )" API call or a "QueryInterface( )" call; issuing calls to the object through its virtual function table or a dispatch interface (for dynamic binding); and finally releasing the object, such as by calling the object's "Release( )" method. (In some implementations of the invention, such as in the QC architecture 130 illustrated herein, the client may use a different object creation mechanism for queued method invocations (i.e., the "CoGetObject( )" API and a queue moniker, described below) than for real-time method invocations, but still invokes methods of the object using common call semantics.) The queued component 86, on the other hand, has its methods invoked through its virtual function table or a dispatch interface, as with a local method call. In other words, the client 132 and the queued component 86 need not be written to use any message queuing API in order to issue or receive queued method invocations of the queued component's methods.

The client's method invocations on the queued component 86 are recorded at a client-side 140 of the client-to-object interaction, and later played back and issued to the queued component 86 on a server-side 142 of the interaction. The illustrated QC architecture 130 records all the client's method invocations on the queued component 86, and does not play the method invocations back until after the client 132 completes its use of the queued component 86 (i.e., after the client releases the queued component). Further, if the client 132 participates in a transaction, the method invocations are not played back until the transaction reaches normal completion.

The illustrated QC architecture 130 is implemented in the COM+ component of the Microsoft Windows NT 5.0 operating system. The COM+ component supplies various runtime object services to COM objects that run on the computer system 20. The runtime services provide a recorder 150, a listener 152 and a player 154 that effect queued method invocations via normal call semantics by the client 132 on the queued component 86. The recorder 150 acts as a proxy for the queued component to perform marshaling of the client's method invocations with their call parameters and associated data into messages, and also uses a messaging queuing API (such as, the "Microsoft Message Queue" or "MSMQ") to place the messages in a method invocations message queue 158 that is associated with the queued component 86. (For further details of MSMQ, see Microsoft Developer Network (MSDN) Library Edition—July 1998, SDK Documentation, Platform SDK, Networking and Distributed Services, Microsoft Message Queue Server (MSMQ).) The listener 152 waits for messages to arrive at the queue 158, and dispatches the messages as they arrive to the player 154. The player 154 unmarshals the method invocation from the message, and issues the method invocations to the queued component 86.

These various parts to the illustrated QC architecture 130 are described in more detail below.

Queued Components

The queued component 86 in the illustrated QC architecture 130 is a COM Object having the structure described above and shown in FIG. 3. The queued component 86 is identified as supporting queued method invocations by associating an attribute (the "QUEUEABLE" attribute) with the component's interfaces. The developer of a component assigns the QUEUEABLE attribute to the component's interfaces by adding an interface attribute macro (i.e., the word "QUEUEABLE") to the interface section of the interface definition language description of the component's class. Alternatively, the developer can set the QUEUEABLE attribute using the above-described "COM+ Explorer," which provides graphical controls on object property sheet dialogs for setting attributes associated with objects in the illustrated execution environment 80. In some embodiments of the invention, the QUEUEABLE attribute can be stored in a catalog 165, operating system registry, or other configuration database associated with the operating system or specific application software.

Several attributes also are associated with the COM+ Application in which the queued component 86 is packaged. A "Queued App" attribute indicates whether the COM+ Application's objects can be invoked via queued method invocations. A "Queue Listener" attribute indicates whether the COM+ Application should start a queue listener, such as the listener 152 (FIG. 2). Also, a "Queue BLOB" attribute contains MSMQ names (as globally unique identifier (GUID) format names) of a set of queues relating to the COM+ Application. ("BLOB" is an acronym for "Binary Large Object.") In the illustrated architecture 130, the "Queued App" and "Queue Listener" attributes are stored as Boolean flags, that may be set to "on" or "off." The "Queue BLOB" attribute stores MSMQ names of five different queues. The "Queued App" and "Queue Listener" attributes can be viewed and designated by an application integrator via the COM+ Explorer utility, which provides checkbox controls for setting the "Queued App" and "Queue Listener" attributes in a COM+ Application property sheet. In response to the "Queued App" and "Queue Listener" attributes being set to "on," the utility generates the "Queue BLOB" attribute.

When the COM+ Application is initially created, the "Queued App" and "Queue Listener" attributes are set to off and the "Queue BLOB" attribute is null. When the "Queued App" attribute is turned on (e.g., by selecting a checkbox control in the COM+ Explorer), the COM+ Explorer initiates an API function in the COM+ runtime services that creates a set of MSMQ queues for the COM+ Application, and stores their MSMQ names in the "Queue BLOB" attribute. Additionally, both the "Queued App" and "Queue Listener" attributes are turned on. The application integrator may then choose to deselect the checkboxes in the COM+ Explorer of either of these attributes to turn the attributes off. This indicates the COM+ Application is to use only real-time method invocations, even though it contains an object that can be a queued component.

In the illustrated QC architecture 130, the interfaces of the queued component are marked directly by the developer with the "QUEUEABLE" attribute. A COM Object is considered to be a queueable component if it has at least one interface marked as "QUEUEABLE." If placed in a COM+ Application that has been designated a "Queued App," the object is considered a queued component. However, in alternative embodiments of the invention, the component itself can be marked with "QUEUEABLE" attribute. All interfaces of the marked component whose methods have only [in] parameters would then be considered QUEUEABLE.

Queued Component Activation

As described above, the client 132 creates the queued component 86 using normal COM call semantics also used for real-time method invocations. More specifically, the client in the illustrated QC architecture 130 creates the queued component 86 in a call to the "CoGetObject( )" API (or the equivalent "GetObject" API according to Visual Basic or Visual Java programming language semantics), which is a standard object instantiation API of COM. The client specifies that the queued component to be created will be used with queued method invocations by specifying "queue:/new:" followed by the program ID or string-form globally unique identifier (GUID) of the queued component as the "displayname" parameter of the "CoGetObject( )" API call. In response, the "CoGetObject( )" API parses this string into a "new" moniker, and a "queue" moniker, which the "CoGetObject( )" API then causes to bind to the queued component. The new moniker performs processing similar to the "CoCreateInstance( )" API to create an instance of the server object. The queue moniker performs processing to set up the recorder structures shown in FIG. 4 for the client to use queued method invocations on the queued component.

In alternative implementations, the client can create the queued component 86 without explicitly specifying queued method invocations in the instantiation request if the queued component has the appropriate attributes (i.e., the QUEUEABLE attribute associated with its interfaces or class). The client simply requests creation of the queued component instance via the "CoGetObject( )" or "CoCreateInstance( )" API, which then create the object as a queued component based on this attribute.

Exemplary object instantiation calls are shown in a program listing 159 of FIG. 7.

Recorder

With reference more particularly to FIG. 4, the recorder 150 in the illustrated QC architecture 130 is a COM Object provided in a COM+ DLL. The recorder DLL is placed at installation by a setup program into a COM+ related directory on the computer 20, such as "d:\Program Files\Microsoft\COM+." The setup also causes the recorder DLL to self-register, including to store configuration information identifying the recorder 150 (such as the class identifier, DLL path name, attributes, etc.) into the catalog or other configuration database.

In the illustrated QC architecture, the proxy object 160 consists of a recorder 150 acting as a proxy manager. The recorder manages one or more interface proxies 166 and 167 that provide an implementation of the interfaces 87 of the queued component 86 so as to proxy for the queued component 86 in the client process 134, and receive method invocations of the client 132 on the queued component 86 as direct method calls to the proxy interfaces. The interface proxies 166–167 are generated according to the Standard Marshaling Architecture of the Microsoft COM RPC (i.e., generated from Microsoft Interface Definition Language (MIDL) descriptions of the queue component 86) or according to the Marshaler of the Microsoft Automation Type Library. (For a more detailed discussion of the Microsoft COM RPC, see Brockschmidt, *Inside OLE, Second Edition* 277–338 (Microsoft Press 1995)).

More particularly, the recorder 150, acting as proxy manager, implements an "IUnknown" interface 162. As described in the Component Application Objects Overview section above, the client 132 requests an interface pointer by specifying an interface identifier (IID) of the interface in a call to the "QueryInterface( )" method of the IUnknown interface 162. Provided that the specified IID is part of an "immutable IID set" listed in a catalog 165 (FIG. 2), the recorder 150 loads and aggregates an interface proxy 166–167 (sometimes also called a "facelet") that is generated by a MIDL compiler of the Standard Marshaling Architecture to implement a proxy interface 168–169 for the respective queued component's interface whose IID is specified in the client's request. The proxy interfaces 168–169 match the interfaces of the queued component that is ultimately instantiated to receive the queued method invocations.

The recorder 150 also implements an "IRpcChannelBuffer" interface 170 and an "IObjectControl" interface 172. The IObjectControl interface 172 is an interface defined per the Microsoft Transaction Server (MTS) and used by the recorder 150 to receive notifications of object deactivation in accordance with the Just-In-Time Activation feature of MTS (which feature is integrated into COM+). The "IRpcChannelBuffer" interface is an interface defined in the COM RPC Standard Marshaling Architecture.

The interface proxies 166–167 are generated by the MIDL compiler to marshal the client's method invocations with appropriate call parameters and related data from the memory of the client process 134 into a buffer. As per the Standard Marshaling Architecture of the Microsoft COM RPC, the interface proxies 166–167 use the "IRpcChannelBuffer" interface 170 (which is a standard COM interface defined in the Standard Marshaling Architecture) to transfer the buffer to the ASP 90 of the queued component. However, instead of transferring the method invocation via a real-time RPC, the implementation of the "IRpcChannelBuffer" interface 170 in the recorder 150 records all of the client's method invocations on the queued component 86 (other than those to the IUnknown interface's methods) into one contiguous buffer. The recorder implements these IUnknown methods locally and therefore does not record such method invocations in the buffer.

After the client completes use of the queued component (i.e., the client releases its reference to the queued component), the MSMQ resource dispenser 176 passes the buffer of the method invocations to MSMQ. After the client's transaction completes successfully, MSMQ sends the contiguous buffer containing the recorded method invocations as a message to the message queue 158 of the COM+ Application that contains the queued component 86. On the other hand, if the client's transaction aborts, the MSMQ discards the buffer, does not send the message, and the recorded method invocations are canceled. (In some cases where a transaction is "doomed" to abort, the MSMQ resource dispenser simply does not pass the buffer to MSMQ, since the buffer would be discarded in abort processing anyway.) The MSMQ resource dispenser 176 has an interface 178 to receive the recorder's request to send the buffered method invocations to the message queue 158. The MSMQ resource dispenser 176 provides a cache of open MSMQ queues, and uses MSMQ APIs to send the buffer of method invocations over MSMQ to the message queue 158.

Listener

With reference again to FIG. 2, the listener 152 is a COM+-provided object that monitors the message queue 158 of the COM+ Application containing the queued component 86. The listener 152 is created at startup of the COM+ Application if the COM+ Application has the message queue specified in its "Queue BLOB" attribute and the "Queue Listener" attribute is set on. The listener 152 opens the COM+ Application's message queue 158, and waits for message to arrive. As messages arrive, the listener 152 dispatches a thread to execute an instance of the player 154 that consumes and processes the messages. In the illustrated QC architecture 130, there is a single listener 152 per ASP 90.

At startup of the listener 152, the message queue 158 can potentially contain a large number of messages from queued method invocations of many clients 132. Further, the listener 152 may monitor several message queues for COM+ Applications in the ASP 90. The listener 152 therefore preferably uses a modest size thread pool from which the player threads are dispatched so as to maximize message processing throughput. The modest number of threads avoids overloading the server computer processor. Further, since the queued method invocations do not require real-time response, there is no need to immediately schedule new threads for the queued messages. Alternatively, object instance pooling of the queued component with upper and lower bounds on a number of pooled object instances can be used to prevent overload. In the case of multiple messages queues, the listener 152 preferably fairly distributes player thread dispatching among the queues so that messages are not consumed from one queue before beginning dispatches for another queue.

Player

With reference to FIG. 5, the player 154 is implemented in a COM Object provided in a COM+ Utility library (also a DLL file in the COM+ directory). As described above, the listener 152 creates and invokes the player 154 in the listener's ASP 90 when a message with method invocations for the queued component 86 arrives. The player 154 has a transactional attribute set to "transaction required." This causes the COM+ execution environment 80 to automatically start a transaction in which to create the player, in accordance with the automatic transactions architecture described in the aboveincorporated Automatic Transactions Patent Application. The method invocations played back by the player 154 to the queued component 86 also are automatically associated into this transaction.

After creation, the player 154 calls routines in the listener 152 to retrieve the queued message containing method invocations on the queued component 86. The player 154 first acquires a buffer, then uses the listener routines to load the message into the buffer via an "MQReceiveMessage" API (a standard MSMQ API) operation. The "MQReceiveMessage" API operation is made part of the player's transaction.

The player 154 then instantiates the queued component 86 in the ASP 90, and acts as a stub manager in a stub object 180 that manages interface stubs 182-183 generated according to the Standard Marshaling Architecture of the Microsoft COM RPC (i.e., generated from Microsoft Interface Definition Language (MIDL) descriptions of the queue component 86) or according to the Marshaler of the Microsoft Automation Type Library. As the stub manager, the player 154 loads the interface stubs 182–183 (sometimes also called "stublets") for the queued component's interface 87 as their respective interface identifiers (IIDs) are encountered in the message. The player 154 uses the stublets 182–183 to unmarshal method invocations data from the message, and issue the unmarshaled method invocations to the queued component 86. The player 154 also interprets security headers inserted by the recorder 150 by calling appropriate security services.

Persistent Server-Side Aborts

The listener 152 and the player 154 cooperate to handle "poison messages" or "persistent server-side aborts." (A poison message in this context is one that contains method invocations that consistently result in transaction aborts when played back to the queued component.) More specifically, if a group of method invocations being played back to the queued component 86 results in an abort of the player's transaction, then the queued component's work is rolled back. The transaction abort also causes MSMQ, as part of its transaction abort processing, to move the method invocations message back into the COM+ Application's message queue 158 for a retry. In the illustrated QC architecture 130, the player 154 will abort the transaction on receiving a return value from the queued component 86 indicating an error or failure (e.g., a failure HRESULT value). If processing of a method invocation in the queued component warrants an abort, the queued component 86 also may call the "SetAborto" method (as described in the above-incorporated Automatic Transactions Patent Application) to cause the transaction to abort.

In the illustrated QC architecture 130, there are five message queues associated with the COM+ Application, including a normal input queue, a "first retry" queue, a "second retry" queue, a "third retry" queue, and a "final resting" queue. The QC architecture uses these queues to handle persistent server-side aborts. More specifically, if playing the method invocations to the queued component 86 repeatedly results in a transaction abort, the QC architecture 130 cycles through the sequence of: (1) the player 154 retrieves the method invocations message from the COM+ Application queue; (2) the player 154 instantiates the queued component 86 and plays the method invocations to the queued component; (3) the transaction aborts and is rolled back; and (4) MSMQ returns the message to the top of the COM+ Application's message queue from which it was retrieved.

On successive aborts, the player 154 moves the returned "poison message" through the sequence of retry queues of the COM+ Application. Alternative embodiments of the QC architecture can use other numbers of retries and intervals than those described below for the illustrated architecture. Specifically, on return to the normal input queue after an abort, the player 154 moves the returned message to the first retry queue. The listener 152 services the first retry queue to exhaustion once every minute, which replays the message via the player 154 to the queued component 86 at approximately one minute intervals.

After the message is returned a third time to the first retry queue, the player 154 moves the message to the second retry queue. The listener 152 services the second retry queue to exhaustion every three minutes. This again replays the message via the player 154 to the queued component 86 at such intervals.

After the message is returned three times to the second retry queue, the player 154 moves the message to the third retry queue. The listener 152 services the third retry queue to exhaustion every five minutes, which again replays the message via the player 154 to the queued component 86 at those intervals.

After the message is returned a fifth time to the third retry queue, the player 154 moves the message to the COM+ Application's final resting queue. The final resting queue, however, is not serviced by the listener 152. The message remains in the final resting queue until manually moved (using the Queued Components Message Mover utility described below) or purged by the MSMQ Explorer (a utility program for managing MSMQ).

At each abort, the player 154 writes an event log message. The player 154 writes an additional event log message when a message is moved from one queue to another. It writes yet another unique event log message when the message is moved to the final resting queue. The player 154 may additionally modify the message before moving from queue to queue, such as to augment the message with diagnostic information.

The queued component 86 may optionally have an associated exception handler 188, which is specified by an "Exception_CLSID" entry registered for the queued component 86 in the catalog 165. The exception handler is a COM Object that supports an "IPlaybackControl" interface 190. If the exception handler 188 is registered for the queued component 86, the player 154 calls the "IPlaybackControl" interface 190 of the exception handler first before playing back any method invocations from the message. The queued component 86 may itself provide the "IPlaybackControl" interface 190, and specify itself as the exception handler in the "Exception_CLSID" entry. If no "Exception_CLSID" entry is specified, the player 154 also will query for and call the "PlaybackControl" interface 190 on the queued component 86 for exception handling.

The "PlaybackControl" interface 190 is intended to inform the exception handler 188 that the message is about to be placed in the final resting queue so as to allow alternative handling of the persistent abort. The exception handler may implement problem diagnosis information gathering or generation of an object or message that informs the client of a consistent and serious problem in response to the player's calls to this interface. If the queued component 86 does not have an associated exception handler, the "poison message" is simply placed on the final resting queue when its retries have been exhausted as described above. However, if the exception handler exists, the player 154 calls the "IPlaybackControl" interface's methods one last time before the message would be moved to the final resting queue. If the method invocation playback to the queued component 86 still results in an abort on this final time, the "poison message" is placed on the final resting queue.

At the client side, on the other hand, MSMQ may be unable to move a message across to the COM+ Application's input message queue. This can happen, for example, when the queue access controls do not permit the message to be moved from client to server. In such a case, MSMQ moves the message to a client-side queue manager's "Xact Dead Letter" queue. The QC architecture 130 provides a dead letter queue monitor 194. The monitor 194 instantiates the exception handler 188 specified by the "Exception_CLSID" catalog entry for the queued component 86 on the client computer 92, and issues a "QueryInterface( )" call with the IID of the "IPlaybackControl" interface 190. If this succeeds, the monitor invokes the "IPlaybackControl::FinalClientRetry( )" method, and plays back the method invocations from the message to the client side implementation of the queued component 86. This client-side queued component can optionally preserve diagnostic information or take action to reverse the effect of (compensate for) a prior transaction. If the playback commits, the message is removed from the dead letter queue. If the playback aborts or the exception handler 188 and IPlaybackControl interface 190 are not available, the message remains on the dead letter queue for manual handling.

Queued Components Message Mover

The QC architecture 130 provides an administration tool referred to as the "Queued Components Message Mover" to allow a system administrator or other person to manually move messages from one COM+ Application queue to another. As described above, the QC architecture 130 handles persistent server-side aborts by moving a message into a final resting queue so as to prevent the listener 152 and player 154 from continually "looping" on the message. In some cases, the cause of the persistent aborts can be corrected at the server computer 84. For example, the aborts may be due to a resource (e.g., database) being unavailable. After the situation is corrected manually, the previously poison message can be manually moved back to the input message queue of the COM+ Application using the Queued Component Message Mover utility so as to allow more retries. The Queued Component Message Mover utility preferably moves the messages as a transaction, so that no messages are lost or duplicated in the event of a failure during the move. The Queued Component Message Mover may be operated programmatically via OLE automation, such as using a Visual Basic script.

Interfaces

FIG. 8 shows a program listing 200 defining the "IPlaybackControl" interface 190. As described above, this interface is implemented by the exception handler 188, which is registered in the catalog 165 for the queued component 86 to participate in abnormal handling of persistent server-side aborts and client-side MSMQ delivery failures. The interface 190 includes a "FinalClientRetry( )" method and a "FinalServerRetry( )" method.

The "FinalClientRetry( )" method informs the exception handler 188 on the client computer 92 (if one is defined) that all attempts to deliver the message via MSMQ to the server computer 84 were rejected, and the message ended up on the "Xact Dead Letter" queue. For example, the queue's permissions may not permit the message to be delivered to the queue. As messages arrive on the Xact Dead Letter queue, the QC architecture 130 calls the "FinalClientRetry( )" method to so notify the exception handler. The exception handler can then take exceptional action related to the queued component class, such as recording the failure in application-specific terms, or sending a mail message to the end-user or administrator, or even to take client-side compensating action such as reversing the effect of an earlier transaction. If the exception handler identified for the queued component class does not implement this interface or its "FinalClientRetry( )" method call returns a failure result, then the message is left on the Xact Dead Letter queue.

The "FinalServerRetry( )" method informs the queued component's exception handler on the server computer 84 that all attempts to play back the deferred activation to the queued component 86 have failed (e.g., by an error HRESULT or transaction abort), and the message is about to be moved to the COM+ Application's "final resting" queue. The server-side exception handler can take exceptional action specific to the queued component class, such as recording the failure in application-specific terms, or sending a mail message to the end-user or administrator, or even to take client-side action such as reversing the effect of an earlier transaction. Preferably, the queued component should make every effort to complete this transaction successfully, or manual intervention will be required to reprocess the message. If the exception handler registered for the queued component class does not implement the "PlaybackControl" interface, or the implementation of the "FinalServerRetry( )" method returns a failure result, or the transaction aborts, then the message is moved to the "final resting" queue.

Queued Method Invocations Message

Figure 10:
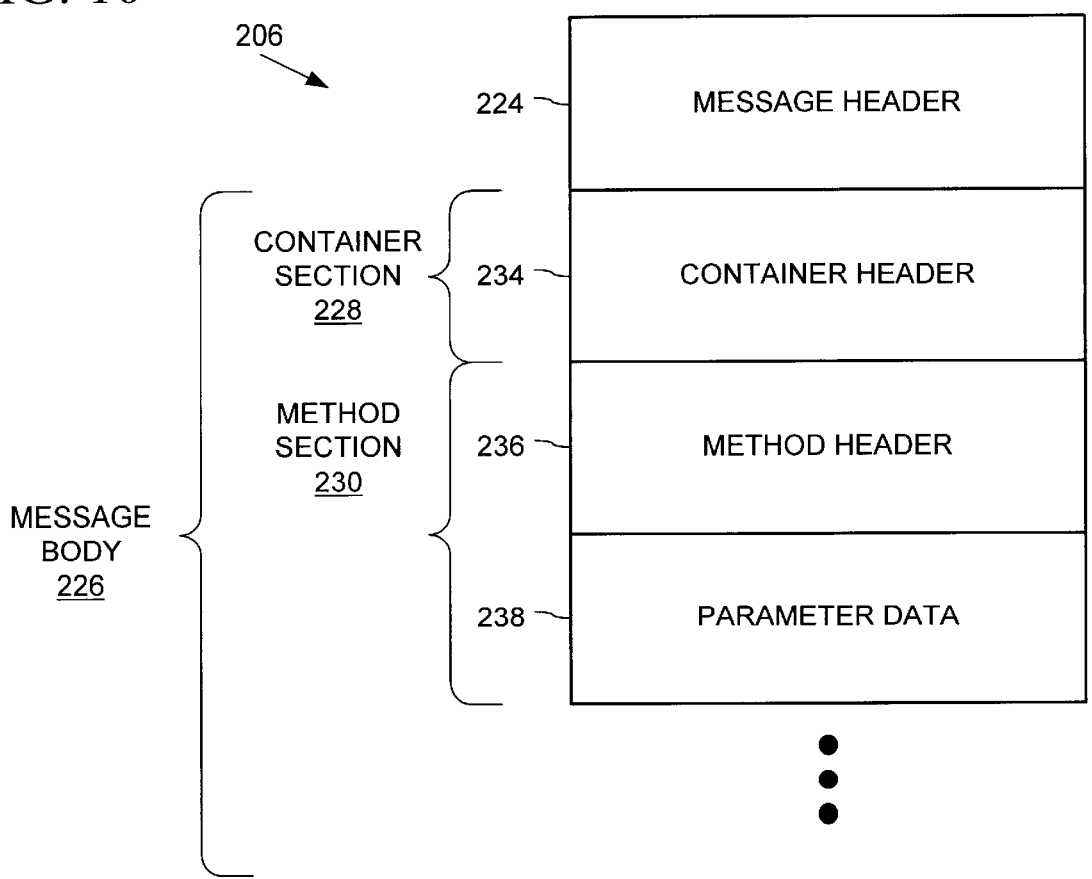
FIG. 10 is a block diagram of a queued method invocations message format in the runtime architecture of FIG. 2.

With reference now to FIGS. 9 and 10, a message 220 containing the client's method invocations that is recorded by the recorder 150 in the QC architecture 130 has a format shown in FIG. 10 and using data structures defined in the program listing 222 shown in FIG. 9. Per this message format, the message 220 contains a message header 224 and message body 226. The message body 226 contains a container section 228 and one or more method, security or diagnostic sections 230. The container, method security and diagnostic sections 228 and 230 begin with an appropriate type section header 234, 236. The section headers 234, 236 further all contain a common header (the "_CommonHeader" structure in FIG. 9). The container section 228 has a container section header 234, while the method sections each contain a long or short method header 236 and parameter data 238.

The message header 224 contains a number of message properties set by either the recorder or MSMQ, and sent along with the message body. These message properties include a priority, a message ID, a correlation ID, a MSMQ path name, and a response queue name. The priority is a value that can be set to determine the order in which messages are played back from the COM+ Application's message input queue. A higher priority value can be assigned by the client application to give priority processing to particular operations, such as to prioritize credit card authorizations over check processing in a banking application. The message ID identifies the individual message. The correlation ID is used in the QC architecture 130 to group a set of queued method invocation messages in a workflow. The initial message that starts the workflow creates a message with a null correlation ID. The message ID of the initial message becomes the correlation ID of all subsequent messages within the workflow. The MSMQ path name consists of a destination computer name, a backslash character (i.e., "\"), and a name of a queue on the destination computer, e.g., "MachineName\payroll." A period as the machine name designates "this computer," i.e., the client computer. The response queue name designates a queue for response messages from the server computer.

The common header 232, 233 (defined by the structure declaration "_CommonHeader" in the program listing 206 of FIG. 9) in each of the sections 228, 230 consists of two values, a type and a length. The type value identifies the type of section as shown in the following Table 1. The length is that of the section header and its contents. Thus, adding the length to a pointer to the current "__CommonHeader" steps to a next "__CommonHeader."

TABLE 1

Section Type Field.

| Section type | Field Value |
|---|---|
| Container | "CHDR" |
| Method | "METH" |
| Short Method | "SMTH" |
| Security | "SECD" |
| Security Reference | "SECR" |
| Diagnostic | "DIAG" |

The container section 228 includes a container header 234. As defined by the "__ContainerHeader" structure declaration in FIG. 9, the container header 234 includes a GUID signature, version numbers, and a moniker to create the server object. The GUID signature ("guidSignature") identifies the message as being from a recorder to a player in the QC architecture 130. Different values of the GUID signature can be used to identify different player classes. The moniker is a stream form of a COM moniker for creating the queued component 86. In alternative architectures, the container header can contain additional values, such as a message protocol version number and client-side COM version identifiers.

The method header 236 (defined in the structure declarations, "__ShortMethodheader" and "__MethodHeader" in FIG. 9) represents a method invocation on the queued component 86. The method header can be a short or long header, which differ in that the long method header specifies an interface identifier (IID). The IID for the short method header is implied from the most recent long method header encountered in a left-to-right pass of the entire message. The method header 236 contains a method identifier, a data representation, a flags field, a length, an interceptor flag, and an IID (for a long method header). The method identifier ("dwMethodId") is an index into the virtual function table 104 (FIG. 3) of the method to be invoked. The data representation contains the "RPCOLEDATREP" value from an "RPCOLEMESSAGE" per convention of the Standard Marshaling Architecture of COM RPC, which is one of the parameters presented by the interface proxy 166–167 to the "IRPCChannelBuffer" interface 170 of the recorder 150 during marshaling of the method invocation (FIG. 4) per convention of the Standard Marshaling Architecture of COM RPC. The flags field contains the "RPCOLEMESSAGE rpcFlags" field per convention of the Standard Marshaling Architecture of COM RPC., also presented by the interface proxies to the recorder 150 during marshaling the method invocation. The length field contains the "RPCOLEMESSAGE cbBuffer" field per convention of the Standard Marshaling Architecture of COM RPC, also presented by the interface proxies to the recorder 150 during marshaling the method invocation. The interceptor flag contains either 0 or 1 to indicate the marshaling method used. A 0 means that a MIDL-generated interface proxy was used. The IID in a long method header indicates the interface of the queued component 86 whose method is invoked.

The parameter data 238 in the method section is the marshaled parameter data produced by the interface proxy 166–167 from the method invocation.

The message body 226 also can contain security header sections, security reference sections, and diagnostic sections as identified in the section type of the section's common header (the values shown in Table 1 above). A security header section contains a security header as defined in the "__SecurityHeader" data structure declaration of FIG. 9. The security header section contains security information extracted at the recorder that is used to check access privilege at playback of the method invocations. This security information can vary on a method-by-method basis. The security reference section contains a security reference header that specifies a previous security header section in the message to save repeating the security information when the same security information applies to a subsequent method invocation in the message. The diagnostic section is data appended to the message body when the message is moved between COM+ Application queues after a server-side abort. This diagnostic data may include, for example, the time and reason for failure. The diagnostic sections are ignored by the player 154 during playback of the message, but can be used to facilitate manual intervention (e.g., after the message arrives in the final resting queue of the COM+ Application).

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An object runtime services system for running objects on a computer, the objects having interfaces with methods for calling by clients, the system comprising:

a recorder operating to intercept a plurality of method invocations issued in a transaction by a client to invoke methods of an object, and further operating to record the method invocations as a message;

a message queue for queuing the message to a later time;

a player operative to extract the method invocations from the message, and issue the method invocations to the object at the later time, whereby the client asynchronously invokes the methods of the object.

2. The system of claim 1, further comprising:

a proxy operating to receive the method invocations by the client and marshal parameters of the method invocations.

3. The system of claim 1, wherein the player further operates to issue the method invocations to the object in a new transaction.

4. A process for a client to access object methods, the process comprising:

designating whether an object is to receive method calls on a real-time or queued basis;

calling methods of an object by a client in accordance with a call semantic of an object model;

if the object is designated to receive method calls on a real-time basis, issuing the method call to the object and causing the client to block until the call returns from the method;

if the object is designated to receive the method calls on a queued basis, performing the steps:
recording the method call in a message;
sending the message to a queue;
causing the client to continue execution;
after the client continues execution, retrieving the message from the queue; and
issuing the method call recorded in the message to the object.

5. An object execution system supporting method invocation delivered via a queued message, the system comprising:

an object configuration store containing object properties information representing properties of an object class executable in the system, the object properties information designating the object class as supporting queued method invocation;

a method invocation recording facility operative responsive to request of a client program to supply method invocations recorders for object instances of object classes designated as supporting queued method invocations;

a first method invocations recorder supplied by the method invocation recording facility at request of the client program for an instance of the object class, the first method invocations recorder operating in response to a plurality of method invocations by the client program for the object class instance to cause a data stream representation of the method invocations to be marshaled into a method invocations message for submission into a message queue associated with the object class;

a method invocation play-back facility operative responsive to queued method invocations messages to supply method invocation players for object instances of object classes designated as supporting queued method invocations;

a first method invocation player supplied by the method invocation play-back facility in response to the method invocations message queued to the message queue associated with the object class, the first method invocations player operating in response to the method invocations message to unmarshal the data stream representation and issue the method invocations to the object class instance.

6. The system of claim 5, wherein the first method invocations recorder accepts method invocations for any method supported by an instance of the object class.

7. In a computer system, a method of asynchronously remoting method invocations of a client program to a program component via a message queue, the method comprising:

providing a reference for use by the client program to invoke methods on the program component;

responsive to a client program issuing a set of method invocations for the queued component, marshaling data for the method invocations of the set into a message;

upon release of the reference by the client program, submitting the message to the message queue associated with the program component; and at a later time of processing the message from the message queue, unmarshaling the data for the method invocations from the message, and issuing the set of method invocations to the queued component.

8. The method of claim 7 wherein the reference is to a method invocations recorder.

9. The method of claim 8 wherein the method invocations recorder is a proxy in an address space of the client program for the program component, and has a proxy interface matching an interface of the program component for receiving the set of method invocations issued from the client program.

10. In a distributed computing system where a client program and a server queued component are run on at least one computing machine, a method of transactional queued invoking by the client program of methods on the server queued component, the method comprising:

initiating a first transaction for encompassing processing of the client program;

on request of the client program for a reference to the server queued component, creating a first method invocation recorder in the first transaction and returning a reference for invoking methods of the first method invocation recorder to the client program;

on each of a set of method invocations of the client program made using the reference for invoking methods of the first method invocation recorder, recording by the first method invocation recorder data of the set of method invocations into a method invocations message;

upon committal of the first transaction, submitting the method invocations message into a message queue associated with the server queued component;

creating the server queued component for processing any method invocations recorded in the method invocations message in a second transaction;

retrieving the method invocations message from the message queue within the second transaction;

invoking a set of methods of the server queued component in the second transaction per the recorded set of method invocations.

11. A computer-readable medium having thereon a computer-executable method invocation queuing system program comprising:

a queued component recorder constructor operating on request of a client program to obtain a queued component reference to create a method invocation recording component and return a reference for such method invocation recording component to the client program;

a first method invocation recording component created by the queued component recorder constructor responsive to a first request of a client program to obtain a first reference for a first queued component, the first method invocation recording component having an interface and methods for receiving method invocations made by the client program for the first queued component using the reference, the first method invocation recording component operating in response to the client program's method invocations using the reference to marshal data of the method invocations into a data stream of a message and submit the message into a queue associated with the first queued component.

12. The computer-readable medium of claim 11 wherein the computer-executable method invocation queuing system program further comprises:

a queued method invocations playing component operating to retrieve the message from the message queue, the queued method invocations playing component further operating in response to the message to unmarshal the data stream, and to invoke methods on the first queued component in accordance with the marshaled client program's method invocations.

13. A computer-readable medium having thereon a computer-executable method invocation queuing system program comprising:

a queued method invocations playing component operating to retrieve a method invocations message from a message queue associated with a first queued component, the queued method invocations playing component further operating in response to a message containing a data stream representative of a set of method invocations from a client program for methods of the first queued component to unmarshal the set of method invocations from the method invocations message and to invoke methods on the first queued component based on the unmarshaled set of method invocations.

14. A process for a client to access object methods, the process comprising:

designating whether an interface is to receive method calls on a real-time or queued basis;

calling methods of the interface by a client in accordance with a call semantic of an object model;

if the interface is designated to receive method calls on a real-time basis, issuing the method call to the interface and causing the client to block until the call returns from the method;

if the interface is designated to receive the method calls on a queued basis, performing the steps:
recording the method call in a message;
sending the message to a queue;
causing the client to continue execution;
after the client continues execution, retrieving the message from the queue; and
issuing the method call recorded in the message to the interface.

\* \* \* \* \*

UNITED STATES PATENT AND TRADEMARK OFFICE
CERTIFICATE OF CORRECTION

PATENT NO. : 6,425,017 B1  
DATED : July 23, 2002  
INVENTOR(S) : Dievendorff et al.

It is certified that error appears in the above-identified patent and that said Letters Patent is hereby corrected as shown below:

Title page,
Item [56], References Cited, OTHER PUBLICATIONS,
"Hackathorn" reference "*art1htm*" should read -- *art1.htm* --.
"Managing" reference "1-12" should read -- 1-2 --.
"Loshin" reference "*sec12art1htm*" should read -- *sec12art1.htm* --.
"Hamiltan" reference "*Beanc*" should read -- *Beans* --.
"Indroduction" reference "*intor.doc/html*" should read -- *intro.doc.html* --.
"Client" reference "*doc.guide*" should read -- *doc/guide* --.
"Registry" reference "*rmi-stubs*" should read -- *rmi-registry* --.
"Kiczales" reference "*http://www.parc.xerox.com.spl*" should read
-- *http://www.parc.xerox.com/spl* --
"Aksit" reference "*ECOP*" should read -- *ECOOP* --.
"Matthijs" reference "55 pp." should read -- 5 pp. --.
"Thorup" reference "'97, 1997" should read -- '97, 7pp., 1997 --.

Column 6,
Line 26, "PlaybackControl" should read -- "IPlaybackControl" --.

Column 17,
Line 36, "SetAborto" should read -- "SetAbort( )" --.

Column 18,
Lines 41 and 43, "PlaybackControl" should read -- "IPlaybackControl" --.

Column 20
Line 16, "PlaybackControl" should read -- "IPlaybackControl" --.

Signed and Sealed this

Eleventh Day of May, 2004

JON W. DUDAS  
*Acting Director of the United States Patent and Trademark Office*